(12) United States Patent
Hirata et al.

(10) Patent No.: US 9,182,309 B2
(45) Date of Patent: Nov. 10, 2015

(54) KNOCKING SENSOR

(75) Inventors: Tomohiro Hirata, Komaki (JP);
Takuma Nomura, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 378 days.

(21) Appl. No.: 13/583,944

(22) PCT Filed: Feb. 24, 2011

(86) PCT No.: PCT/JP2011/001056
§ 371 (c)(1),
(2), (4) Date: Sep. 11, 2012

(87) PCT Pub. No.: WO2012/114380
PCT Pub. Date: Aug. 30, 2012

(65) Prior Publication Data
US 2013/0000387 A1   Jan. 3, 2013

(51) Int. Cl.
*G01L 23/22* (2006.01)
*G01L 19/06* (2006.01)
*G01L 19/14* (2006.01)

(52) U.S. Cl.
CPC ........... *G01L 23/222* (2013.01); *G01L 19/0681* (2013.01); *G01L 19/141* (2013.01)

(58) Field of Classification Search
CPC .................................................... G01L 23/222
USPC ......................................................... 73/35.11
See application file for complete search history.

(56) References Cited

U.S. PATENT DOCUMENTS

| 5,258,442 A | 11/1993 | Kato et al. ..................... 524/425 |
| 6,752,005 B2 | 6/2004 | Harada et al. ................ 73/35.13 |

(Continued)

FOREIGN PATENT DOCUMENTS

| CN | 1707232 A | 12/2005 | ............. G01L 19/06 |
| CN | 101213443 A | 7/2008 | ............. G01F 23/26 |

(Continued)

OTHER PUBLICATIONS

Japanese Office Action (Notification of Reasons for Refusal) issued on Feb. 12, 2013, including English translation; 6 pages.

(Continued)

*Primary Examiner* — Hezron E Williams
*Assistant Examiner* — Rodney T Frank
(74) *Attorney, Agent, or Firm* — Kusner & Jaffe

(57) ABSTRACT

There is provided a knocking sensor that has good insulation characteristics even at an operating temperature of 150° C. or more and is excellent in the accuracy of knocking detection. The knocking sensor 10 includes a sensor body 20 including: a metal shell 12 that includes a cylindrical portion 12a and a flange portion 12b positioned at one end of the cylindrical portion 12a and protruding outward in a radial direction; an annular piezoelectric element 15; upper and lower electrode plates 16 and 14 that are superimposed on upper and lower surfaces of the piezoelectric element 15; a weight 17 that is disposed so that the piezoelectric element 15 is interposed between the weight and the flange portion 12b; a lower insulating plate 13 that is disposed between the flange portion 12b and the lower electrode plate 14; and an upper insulating plate 13t that is disposed between the upper electrode plate 16 and the weight 17; and a resin molding 11 that covers the sensor body 20. Further, the thickness of each of the upper and lower insulating plates 16 and 14 is in the range of 0.05 mm to 0.50 mm, and the resin molding 11 is made of polyphenylene sulfide having good heat resistance.

1 Claim, 6 Drawing Sheets

(56) References Cited

U.S. PATENT DOCUMENTS

| | | | |
|---|---|---|---|
| 7,573,274 B2 | 8/2009 | Aratani | 324/713 |
| 7,712,363 B2 | 5/2010 | Sasanuma et al. | 73/295 |
| 8,040,024 B2 * | 10/2011 | Yamazaki et al. | 310/358 |
| 2003/0200790 A1 | 10/2003 | Harada et al. | 73/35.11 |
| 2004/0250603 A1 | 12/2004 | Harada et al. | 73/35.11 |
| 2005/0274189 A1 | 12/2005 | Oda et al. | 73/702 |
| 2007/0224886 A1 | 9/2007 | Rodway | 439/610 |
| 2008/0030208 A1 | 2/2008 | Aratani | 324/713 |
| 2009/0090178 A1 | 4/2009 | Sasanuma et al. | 73/295 |
| 2009/0253847 A1 | 10/2009 | Komatsu et al. | 524/430 |
| 2012/0146462 A1 * | 6/2012 | Yamazaki et al. | 310/334 |

FOREIGN PATENT DOCUMENTS

| | | | |
|---|---|---|---|
| JP | 1-262336 | 10/1989 | F02D 35/00 |
| JP | 3-143958 | 6/1991 | C08L 81/02 |
| JP | 05-012740 | 4/1993 | G01H 11/08 |
| JP | 10-267747 | 10/1998 | G01H 17/00 |
| JP | 11-105097 | 4/1999 | B29C 47/00 |
| JP | 2000-023291 | 1/2000 | G01H 11/08 |
| JP | 2001-235362 | 8/2001 | F02B 77/00 |
| JP | 2003-065998 | 3/2003 | G01N 27/409 |
| JP | 2003-161653 | 6/2003 | G01H 1/00 |
| JP | 2003-227747 | 8/2003 | G01H 11/00 |
| JP | 2003-322580 | 11/2003 | G01L 23/22 |
| JP | 2004-85255 | 3/2004 | G01H 17/00 |
| JP | 2004-117045 | 4/2004 | G01R 15/14 |
| JP | 2004-251792 | 9/2004 | G01H 11/08 |
| JP | 2004-333297 | 11/2004 | G01C 9/06 |
| JP | 2005-249601 | 9/2005 | G01H 11/08 |
| JP | 2005-292123 | 10/2005 | G01H 17/00 |
| JP | 2006-151442 | 6/2006 | B65D 65/40 |
| JP | 2007-258181 | 10/2007 | H01B 7/02 |
| JP | 2008-026326 | 2/2008 | F02D 35/00 |
| JP | 2008-39571 | 2/2008 | G01R 15/14 |
| JP | 2008-128917 | 6/2008 | G01H 17/00 |
| JP | 2008-144677 | 6/2008 | F02D 35/00 |
| JP | 2008-163222 | 7/2008 | C08L 81/02 |
| JP | 2009-215680 | 9/2009 | D01D 5/098 |
| JP | 2009-263640 | 11/2009 | C08L 101/00 |
| WO | WO 2007/004583 | 1/2007 | G01N 27/06 |

OTHER PUBLICATIONS

Japanese Office Action—Finial Rejection (from corresponding Japanese App. No. 2009-266837) issued on Sep. 3, 2013, including English translation; 4 pages.

Office Action received in corresponding Chinese Patent Application No. 201180065709.4, dated May 27, 2014 (English-language translation included).

Form PCT/ISA/210—Int'l Search Report (from corresponding Int'l Patent App. No. PCT/JP2011/001056—English version only); 2 page.

Notification of Reasons for Refusal received in connection with Japanese Patent Application No. 2009-266837 (English-language translation included) dated Jan. 7, 2015.

* cited by examiner

KNOCKING SENSOR

TECHNICAL FIELD

The present invention relates to a knocking sensor that uses a piezoelectric element.

BACKGROUND ART

A knocking sensor, which detects the knocking of an internal combustion engine of an automobile or the like, is known and the delay control of an ignition timing of a spark plug is performed according to the detection of the knocking sensor.

A knocking sensor, which has a structure shown in FIGS. 5 and 6, is known as the above-mentioned knocking sensor (Patent Documents 1 and 2). The knocking sensor 100 is a so-called center hole-type non-resonant knocking sensor that has a mounting hole 120b, through which the knocking sensor is mounted on a cylinder block of an internal combustion engine, at the central portion thereof.

As shown in an exploded perspective view of FIG. 6, the knocking sensor 100 includes a metal shell 120 that includes a cylindrical portion 121 and a flange portion 122 positioned at the lower end of the cylindrical portion 121. An annular lower insulating plate 130, a lower electrode plate 140, a piezoelectric element 150, an upper electrode plate 160, an upper insulating plate 135, a weight 170, and a disc spring 180 are fitted to the outer periphery of the cylindrical portion 121 in this order from the flange portion 122. Meanwhile, upper and lower terminals 141 and 161, which are used to take a voltage, are formed on the outsides of the lower and upper electrodes 140 and 160, respectively, so as to extend in the shape of a piece in the radial direction. A male screw portion 121b is formed on the upper outer peripheral surface of the cylindrical portion 121. Meanwhile, a female screw portion 185b is formed on the inner surface of a nut 185. Further, the nut 185 is threadably engaged with the male screw portion 121b. Accordingly, a laminated body, which reaches the disc spring 180 from the lower insulating plate 130, is interposed between the flange portion 122 and the nut 185, so that a sensor body 190 is formed (see FIG. 5). Furthermore, the sensor body 190 is covered with a resin molding 110 as shown in FIG. 5, so that the knocking sensor 100 is formed.

When being used, the knocking sensor 100 having this structure is mounted so that the lower surface of the flange portion 122 of the metal shell 120 comes into contact with the cylinder block. Accordingly, the metal shell 120 is electrically connected to (comes into electrical contact with) the cylinder block. As a result, the weight 170, which is electrically connected to the metal shell 120, is also electrically connected to (also comes into electrical contact with) the cylinder block. Accordingly, the lower insulating plate 130 that electrically insulates the flange portion 122 of the metal shell 120 from the lower electrode plate 140 and the upper insulating plate 135 that electrically insulates the upper electrode plate 160 from the weight 170 are used in the knocking sensor 100 as components of the sensor body 190 so that the insulation between the piezoelectric element 150 and the metal shell 120 and the weight 170 is secured. Meanwhile, a cylindrical insulating sleeve 131 is fitted to the outer peripheral surface of the cylindrical portion 121, so that the lower electrode plate 140, the piezoelectric element 150, and the upper electrode plate 160 are prevented from being electrically connected to the cylindrical portion 121.

[Patent Document 1] JP-A-2003-322580
[Patent Document 2] JP-A-2008-144677

SUMMARY OF INVENTION

Problem that the Invention is to Solve

A polyamide resin such as nylon is generally used as the material of the resin molding of the above-mentioned knocking sensor, so that the operating temperature of the knocking sensor becomes about 130° C. Meanwhile, in recent years, a tendency to operate an engine at a high temperature is increased in order to improve the fuel efficiency of an engine. For this reason, the operating temperature of the knocking sensor is also required to be 150° C. or more.

Meanwhile, there is a problem in that the insulation resistance of a knocking sensor in the related art is reduced at a high temperature of 150° C. or more. Here, from the examination of the inventors, it was ascertained that the insulation resistance of a knocking sensor is determined by the surface resistance of the resin molding 110 and the thicknesses (that is, volume resistance) of the lower insulating plate 130 and the upper insulating plate 135. That is, at least one of the thickness direction of the lower insulating plate 130 (the insulating plate 130 itself) and the inner surface of the resin molding 110 (the surface of the resin molding 110 coming into contact with the lower insulating plate 130) becomes a conduction path between the flange portion 122 of the metal shell 120 and the lower electrode plate 140, so that a phenomenon where the insulation resistance of the knocking sensor 100 is reduced due to a temperature rise occurs. Further, at least one of the thickness direction of the upper insulating plate 135 (the upper insulating plate 135 itself) and the inner surface of the resin molding 110 (the surface of the resin molding 110 coming into contact with the upper insulating plate 135) becomes a conduction path between the upper electrode plate 160 and the weight 170, so that the above-mentioned phenomenon occurs. Meanwhile, since the resin molding 110 is thick, not the thickness direction of the resin molding but the surface of the resin molding becomes a conduction path and surface resistance becomes an object that determines the insulation characteristics.

Here, since the lower and upper insulating plates 130 and 135 are easily worked, there is room to adjust the thicknesses of the lower and upper insulating plates and select the materials of the lower and upper insulating plates. Accordingly, the volume resistances of these insulating plates 130 and 135 themselves tend to be easily increased. However, since the resin molding 110 requires moldability and there is a restriction on the size of the knocking sensor, the material of the resin molding should be selected and the size of the resin molding should be set in consideration of this. For this reason, it is not easy to increase the surface resistance of the resin molding 110. Accordingly, in order to increase the insulation resistance of the knocking sensor as a whole and to allow the knocking sensor to be used at a high temperature of 150° C., it is important to increase the surface resistance of the resin molding 110 by increasing the surface resistivity of the resin molding 110 itself under high temperature.

Further, it is considered that the insulation resistance of the knocking sensor 100 is increased while the deterioration of the surface resistance (surface resistivity) of the resin molding 110 caused by a temperature rise is compensated if the lower and upper insulating plates 130 and 135 are formed thick while a polyamide resin is used as the material of the resin molding 110. However, there are problems in that the frequency characteristics of the knocking sensor 100 are disturbed and the accuracy of knocking detection deteriorates if the thicknesses of the lower and upper insulating plates 130 and 135 are set to be large.

Accordingly, an object of the invention is to provide a knocking sensor that has good insulation characteristics even at an operating temperature of 150° C. or more and is excellent in the accuracy of knocking detection.

Means for Solving the Problem

In order to solve the above-mentioned problem, according to an aspect of the invention, there is provided a knocking sensor. The knocking sensor includes a sensor body including: a metal shell that includes a cylindrical portion and a flange portion positioned at one end of the cylindrical portion and protruding outward in a radial direction, an annular piezoelectric element that is fitted to an outer periphery of the cylindrical portion, upper and lower electrode plates that are superimposed on upper and lower surfaces of the piezoelectric element, a weight that is fitted to the outer periphery of the cylindrical portion so that the piezoelectric element is interposed between the weight and the flange portion, a lower insulating plate that is disposed between the flange portion and the lower electrode plate and electrically insulates the flange portion from the lower electrode plate, and an upper insulating plate that is disposed between the upper electrode plate and the weight and electrically insulates the upper electrode plate from the weight, and a resin molding that is made of a resin and covers the sensor body. The thickness of each of the upper and lower insulating plates is in the range of 0.05 mm to 0.50 mm, and the resin molding is made of polyphenylene sulfide or a copolymer of tetrafluoroethylene and ethylene.

According to the knocking sensor of the aspect of the invention, the resin molding covering the sensor body is made of a copolymer of tetrafluoroethylene and ethylene or polyphenylene sulfide that has good moldability and heat resistance. The copolymer of tetrafluoroethylene and ethylene and polyphenylene sulfide have high surface resistivity under room temperature and have a surface resistivity of $1.0 \times 10^{10} \Omega$ (or $\Omega/q$) or more at 150° C. For this reason, if the resin molding is made of the above-mentioned specific material, it is possible to increase the insulation resistance of the knocking sensor as a whole without excessively increasing the thicknesses of the upper and lower insulating plates even when the knocking sensor is exposed to a high temperature of 150° C. or more.

Further, since the resin molding is made of the above-mentioned specific material in the knocking sensor according to the aspect of the invention, it is not necessary to excessively increase the thicknesses of the upper and lower insulating plates as described above. Accordingly, it is possible to suppress the thicknesses of the upper and lower insulating plates to 0.50 mm or less. Therefore, according to the aspect of the invention, it is possible to obtain a knocking sensor that has a high insulating property without the deterioration of frequency characteristics of the knocking sensor and is excellent in the accuracy of knocking detection. Meanwhile, the thickness of each of the upper and lower insulating plates is 0.05 mm or more. The reason for this is that it is not possible to maintain the insulation resistance of the knocking sensor to be high as a whole if the volume resistances of the insulating plates themselves are reduced even though the surface resistivity of the resin molding itself is increased. Meanwhile, as long as the above-mentioned thickness range is satisfied, a general-purpose resin material (for example, PET) may be used as the material of each of the upper and lower insulating plates.

Advantages of the Invention

According to the invention, it is possible to obtain a knocking sensor that has good insulation characteristics even at an operating temperature of 150° C. or more and is excellent in the accuracy of knocking detection.

EXEMPLARY EMBODIMENTS FOR CARRYING OUT THE INVENTION

An embodiment of the invention will be described below.

Figure 1:
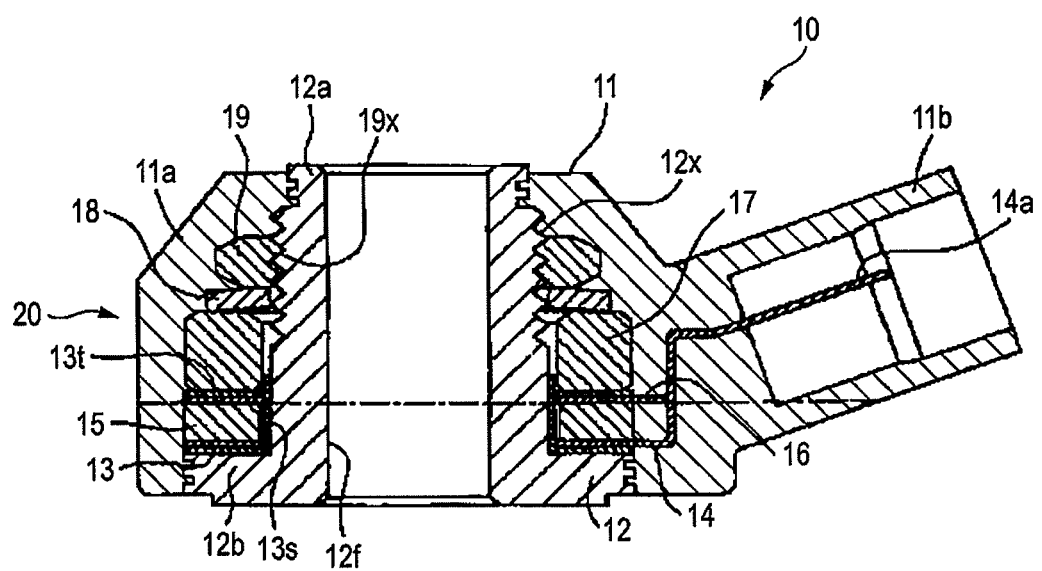
FIG. 1 is a cross-sectional view of a knocking sensor according to an embodiment of the invention taken along an axial direction.

FIG. 1 is a cross-sectional view of a knocking sensor 10 according to an embodiment of the invention.

In FIG. 1, the knocking sensor 10 is a so-called center hole-type non-resonant knocking sensor that has a mounting hole 12f, through which the knocking sensor is mounted on a cylinder block of an internal combustion engine, at the central portion thereof. A sensor body 20 to be described in detail below is covered with a resin molding 11, so that the knocking sensor 10 is formed. The knocking sensor 10 is formed in the shape of a short cylinder as a whole, and a connector portion 11b protrudes outward from a part of the periphery of the cylindrical knocking sensor in a radial direction. In the connector portion 11b, first and second terminals 14a and 16a, which extend from lower and upper electrodes 14 and 16, respectively, protrude (only the first terminal 14a is shown in FIG. 1) so as to be connected to an external connector (not shown).

Figure 2:
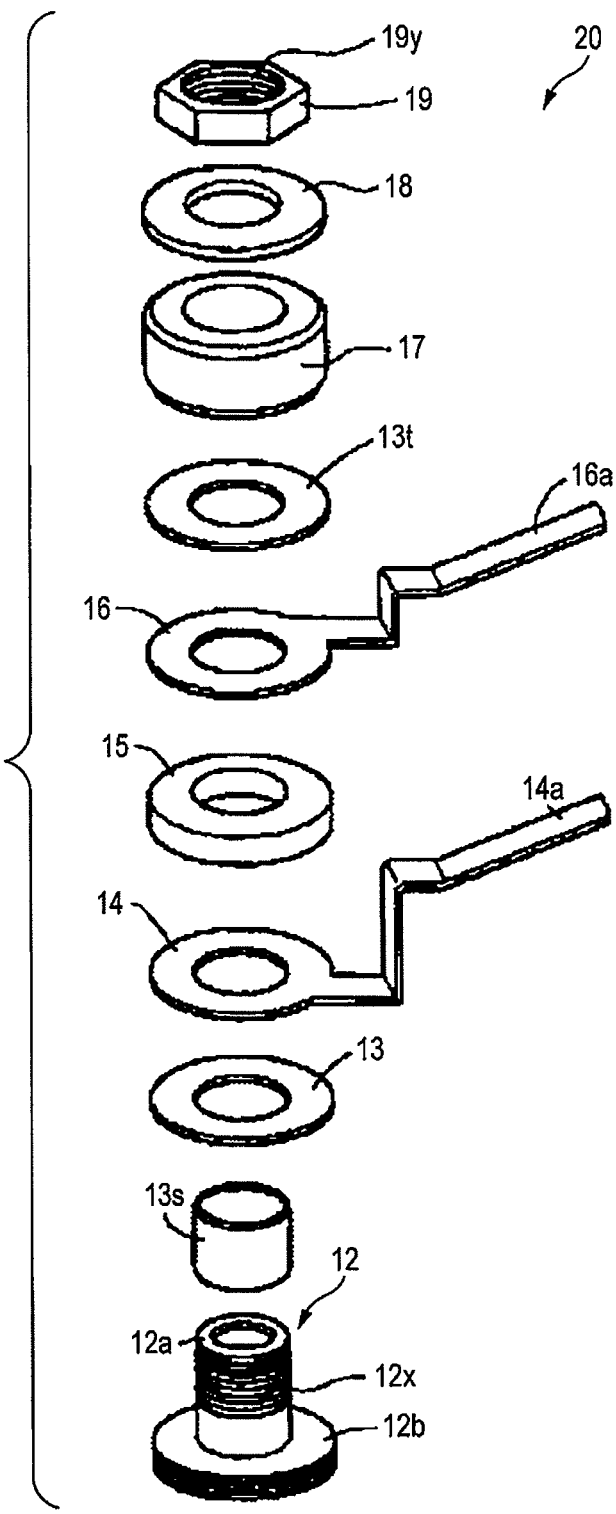
FIG. 2 is an exploded perspective view of the knocking sensor according to the embodiment of the invention.

Further, as shown in an exploded perspective view of FIG. 2, the knocking sensor 10 includes a metal shell 12 that is made of metal and includes a cylindrical portion 12a and a flange portion 12b positioned at the lower end of the cylindrical portion 12a. An annular lower insulating plate 13, a lower electrode 14, a piezoelectric element 15, an upper electrode 16, an upper insulating plate 13t, a weight 17, and a disc spring 18 are fitted to the outer periphery of the cylindrical portion 12a in this order from the flange portion 12b; and the lower insulating plate 13 is placed on the flange portion 12b.

A male screw portion 12x is formed on the upper outer peripheral surface of the cylindrical portion 12a. Meanwhile, a female screw portion 19y is formed on the inner surface of a nut 19. Further, the nut 19 is threadably engaged with the male screw portion 12x. Accordingly, a laminated body, which reaches the disc spring 18 from the lower insulating plate 13, is interposed and fixed between the flange portion 12b and the nut 19, so that the sensor body 20 is formed. Meanwhile, a cylindrical insulating sleeve 13s is fitted to the outer peripheral surface of the cylindrical portion 12a, so that the lower electrode 14, the piezoelectric element 15, and the upper electrode 16 are prevented from being electrically connected to (coming into electrical contact with) the cylindrical portion 12a.

Here, the lower insulating plate 13 is a member that prevents the electrical connection (contact) between the upper surface of the flange portion 12b of the metal shell 12 and the lower electrode plate 14, and the upper insulating plate 13t is a member that prevents the electrical connection (contact) between the upper electrode plate 16 and the weight 17. The thickness of each of the upper insulating plate 13t and the lower insulating plate 13 is set to the range of 0.05 mm to 0.50 mm. If this thickness range is satisfied, it is possible to obtain sufficient volume resistance. Accordingly, the upper insulating plate 13t and the lower insulating plate 13 are made of a general-purpose resin material. In this embodiment, the upper insulating plate 13t and the lower insulating plate 13 are made of PET (polyethylene terephthalate), and the thickness of each of the upper insulating plate 13t and the lower insulating plate 13 is 0.35 mm and the volume resistance of each of the upper insulating plate 13t and the lower insulating plate 13 is 50 GΩ or more.

Meanwhile, in the knocking sensor 10 according to this embodiment, the resin molding 11, which covers the sensor body 20, is made of a copolymer (ETFE) of tetrafluoroethylene and ethylene, or polyphenylene sulfide (PPS) excellent in moldability. ETFE is represented by the following formula (1).

—(CF$_2$—CF$_2$)$_m$—(CH$_2$—CH$_2$)$_n$   (1)

(m and n are natural numbers)

ETFE has moldability (extrusion molding, injection molding, or the like) while having the characteristics of a fluorine resin. ETFE is commercially available as, for example, a fluorine resin ETFE that is manufactured by Asahi Glass Co., Ltd.

PPS or ETFE, which is a resin material forming the resin molding 11, has a surface resistivity of $1.0 \times 10^{10} \Omega$ or more at 150° C. and also has a surface resistivity of $1.0 \times 10^{10} \Omega$ or more at 180° C. (see the following FIG. 4). For this reason, if the resin molding 11 is made of this material, it is possible to increase the insulation resistance of the knocking sensor 10 as a whole even though each of the upper and lower insulating plates is formed thin so as to have a thickness of 0.50 mm or less and the knocking sensor is exposed to a high temperature of 150° C. or more.

Figure 3:
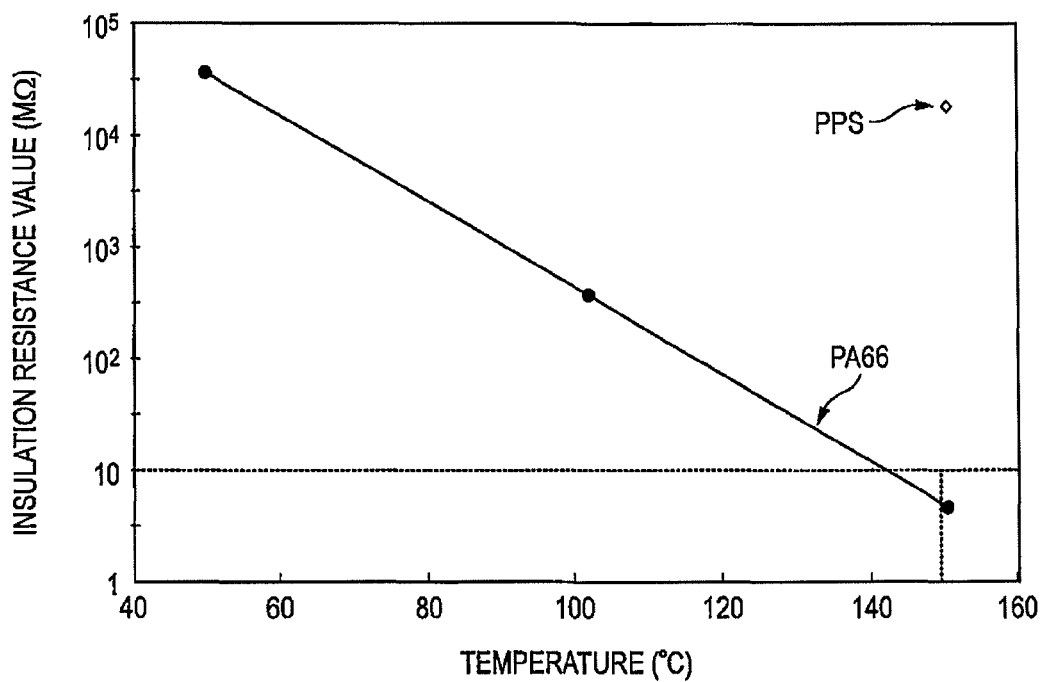
FIG. 3 is a view showing an insulation resistance value of the knocking sensor at 150° C.

FIG. 3 shows the results of the measurement of the insulation resistance of knocking sensors 10 that include resin moldings 11 made of various resin materials. Meanwhile, an insulating plate, which is made of PET so as to have a thickness of 0.35 mm, an inner diameter of 14.72 mm, and an outer diameter of 23.10 mm, is used as the upper insulating plate 13t and the upper insulating plate 13.

First, when a nylon resin (PA66 of FIG. 3) in the related art is used for a resin molding, the insulation resistance of the knocking sensor at 150° C. is lower than 10 MΩ. In contrast, when polyphenylene sulfide (PPS of FIG. 3) of the invention is used as the material of a resin molding, the insulation resistance of the knocking sensor at 150° C. is 10 MΩ or more.

Figure 4:
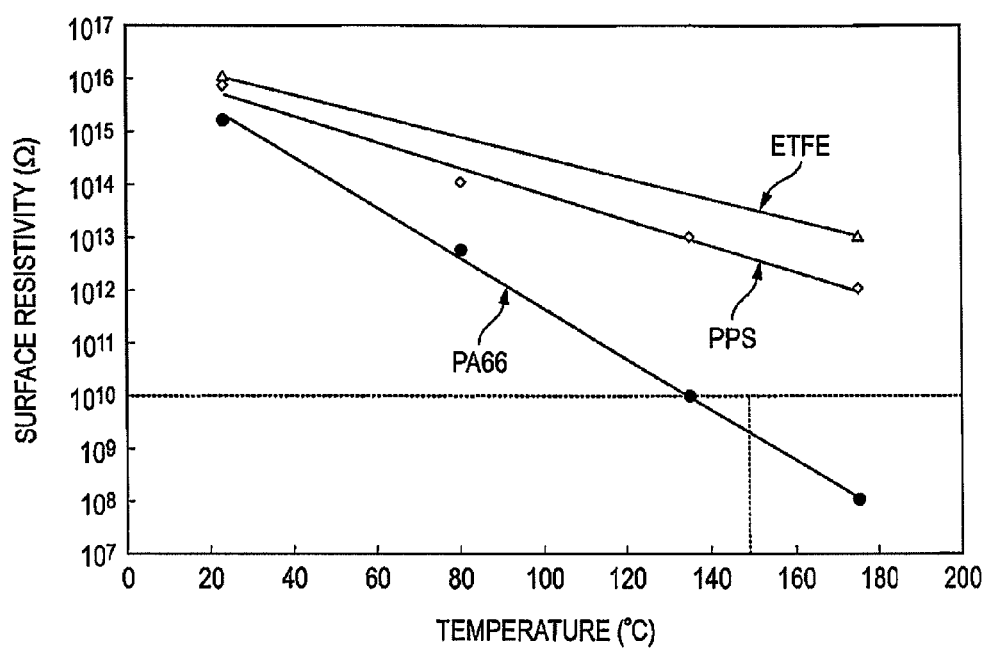
FIG. 4 is a view showing the surface resistivity of various resins.
Figure 5:
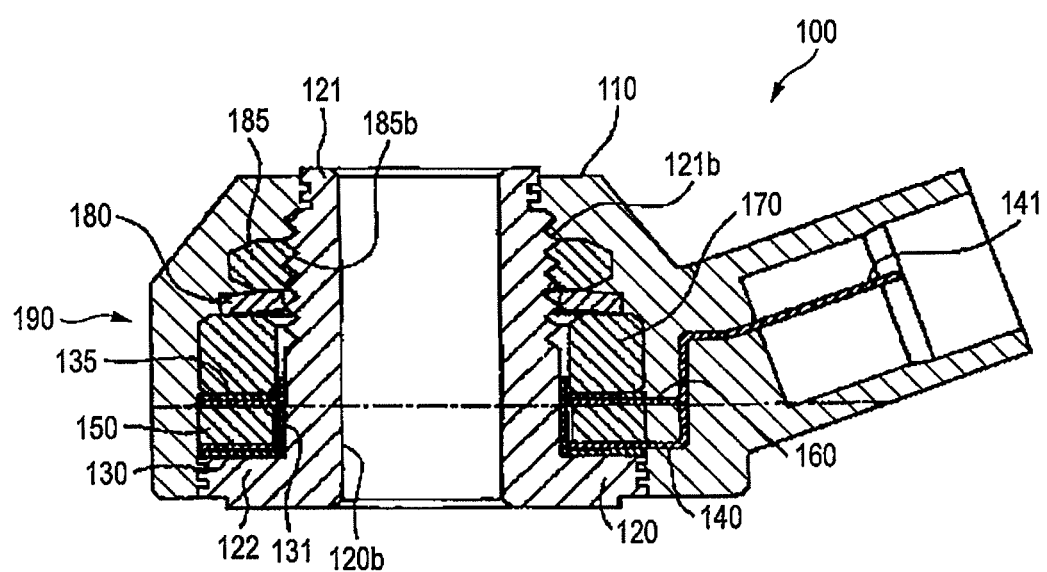
FIG. 5 is a cross-sectional view of a knocking sensor in the related art taken along an axial direction.
Figure 6:
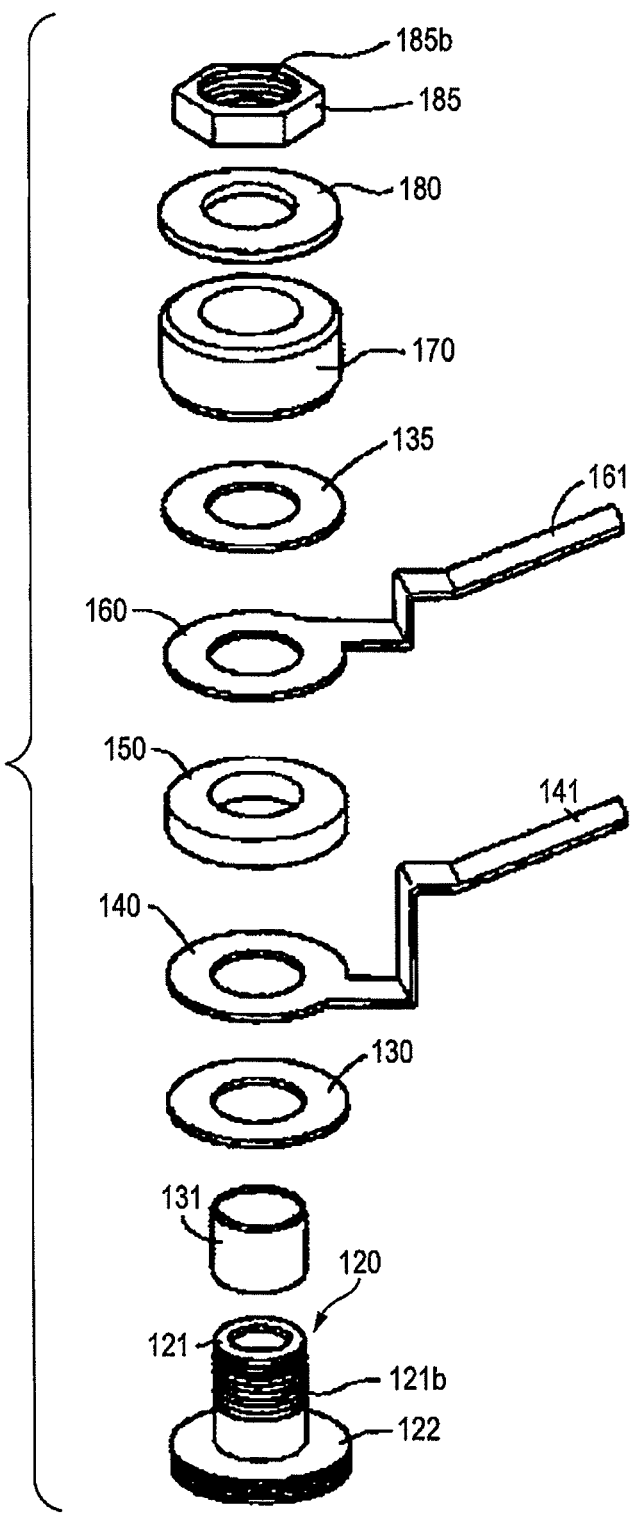
FIG. 6 is an exploded perspective view of the knocking sensor in the related art.

FIG. 4 shows the surface resistivity of various resins. In the case of a nylon resin (PA66 of FIG. 4) where the insulation resistance of a knocking sensor is lower than 10 MΩ, the surface resistivity of a resin molding at 150° C. is lower than $1.0 \times 10^{10} \Omega$. Meanwhile, in the case of polyphenylene sulfide (PPS of FIG. 4) where the insulation resistance of a knocking sensor is 10 MΩ or more, the surface resistivity of a resin molding at 150° C. is $1.0 \times 10^{10} \Omega$ or more. Accordingly, it is understood that a knocking sensor can be used at 150° C. or more if a resin molding of which the surface resistivity at 150° C. is $1.0 \times 10^{10} \Omega$ or more is used.

Meanwhile, even in the case of a copolymer (ETFE of FIG. 4) of tetrafluoroethylene and ethylene, the surface resistivity of a resin molding is $1.0 \times 10^{10} \Omega$ or more at 150° C. Accordingly, it is understood that a copolymer of tetrafluoroethylene and ethylene can be used in the invention.

This surface resistivity is obtained according to JIS K6911, and is obtained from a specimen where a bulk body is made of a material of the resin molding 110 and a plurality of annular electrodes is provided on the surface of the bulk body.

Here, the insulation resistance between the metal shell 12 and the upper electrode 16, the insulation resistance between the metal shell 12 and the lower electrode 14, the insulation resistance between the upper electrode 16 and the lower electrode 14, and the insulation resistance between the upper electrode 16 and the weight 17 are measured, respectively; and the lowest resistance value among these insulation resistances is employed as the insulation resistance of the knocking sensor.

The invention is not limited to the above-mentioned embodiment, and it goes without saying that the invention includes various modifications and equivalents included in the spirit and scope of the invention.

For example, a structure where the weight 17 is held by the nut 19, which is a separate member, with the disc spring 18 interposed between the weight and the nut has been employed in the above-mentioned embodiment. However, the disc spring 18 may be omitted, or one member, which is formed by integrating the weight with the nut, may be used. Further, the nut 19 does not need to be fixed by being threadably engaged with the metal shell 12, and may be fixed to the upper portion of the metal shell 12 by welding. Furthermore, a structure where the connector portion 11b is integrated with the resin molding 11 has been employed in the above-mentioned embodiment. However, the connector portion may be separated from the resin molding, the connector portion and the resin molding may be connected to each other by a cable, and the output of the piezoelectric element 15 may be taken from the separated connector portion.

EXAMPLE

PET having a thickness of 0.35 mm, an inner diameter of 14.72 mm, and an outer diameter of 23.10 mm was used as each of the upper insulating plate 13t and the lower insulating plate 13; PZT (lead zirconate titanate) was used as the material of the piezoelectric element 15; an iron material was used as the material of the weight 17; an iron material was used as the material of the metal shell 12; and a nylon resin and polyphenylene sulfide (PPS) respectively were used as the material of the resin molding 11, so that two knocking sensors 10 were produced.

The insulation resistance value of the obtained knocking sensor 10 at 150° C. was measured. Measurement was performed as follows: the insulation resistance between the metal shell 12 and the upper electrode 16, the insulation resistance between the metal shell 12 and the lower electrode 14, the insulation resistance between the upper electrode 16 and the lower electrode 14, and the insulation resistance between the upper electrode 16 and the weight 17 were measured, respectively; and the lowest resistance value among these insulation resistances was employed as the insulation resistance of the knocking sensor. Meanwhile, insulation resistance (an insulation resistance value) was measured by a megohmmeter WT-8753 (manufactured by HIOKI E. E. Corporation) while a voltage of 500 V was applied between the respective members.

Obtained results are shown in FIG. 3. When a nylon resin (PA66 of FIG. 3) was used as the material of the resin molding as described above, the insulation resistance value of the knocking sensor at 150° C. was lower than 10 MΩ. In contrast, when polyphenylene sulfide (PPS of FIG. 3) was used as the material of the resin molding, the insulation resistance value of the knocking sensor at 150° C. was 10 MΩ or more. Meanwhile, indicating an upper limit of the measurement of a megohmmeter, the insulation resistance value of the knocking sensor at 50° C. when a nylon resin was used as the material of the resin molding and the insulation resistance values of the knocking sensor at 50° C. and 100° C. when polyphenylene sulfide was used as the material of the resin molding were shown as the upper limit of the measurement of a megohmmeter in FIG. 3.

It was ascertained that the knocking sensor according to the invention, which uses polyphenylene sulfide as the material of the resin molding as described above, has good insulation characteristics under high temperature.

EXPLANATION OF REFERENCE

10: knocking sensor
11: resin molding
12: metal shell
12a: cylindrical portion
12b: flange portion
13: lower insulating plate
13t: upper insulating plate
14: lower electrode
15: piezoelectric element
16: upper electrode
17: weight
20: sensor body

The invention claimed is:

1. A knocking sensor comprising:
   a sensor body that includes:
      a metal shell that includes a cylindrical portion and a flange portion positioned at one end of the cylindrical portion and protruding outward in a radial direction;
      an annular piezoelectric element that is fitted to an outer periphery of the cylindrical portion;
      upper and lower electrode plates that are superimposed on upper and lower surfaces of the piezoelectric element;
      a weight that is fitted to the outer periphery of the cylindrical portion so that the piezoelectric element is interposed between the weight and the flange portion;
      a lower insulating plate that is disposed between the flange portion and the lower electrode plate and electrically insulates the flange portion from the lower electrode plate; and
      an upper insulating plate that is disposed between the upper electrode plate and the weight and electrically insulates the upper electrode plate from the weight; and
   a resin molding that is made of a resin and covers the sensor body,
   wherein
   a thickness of each of the upper and lower insulating plates is in the range of 0.05 mm to 0.50 mm, and
   the resin molding is made of polyphenylene sulfide or a copolymer of tetrafluoroethylene and ethylene.

* * * * *